April 2, 1935. O. T. DEHLE Re. 19,514

WASHING MACHINE

Original Filed Sept. 6, 1924

INVENTOR.
Otto T. Dehle,
BY W. Theodore Simmons
ATTORNEY.

Reissued Apr. 2, 1935

Re. 19,514

UNITED STATES PATENT OFFICE 19,514

WASHING MACHINE

Otto T. Dehle, Dorchester, Mass., assignor, by mesne assignments, to Altorfer Bros. Company, East Peoria, Ill., a corporation of Illinois Original No. 1,543,323, dated June 23, 1925, Serial No. 736,308, September 6, 1924. Application for reissue May 6, 1926, Serial No. 107,279

13 Claims. (Cl. 259—101)

There are on the market certain types of washing machines, which, though quite efficient in their operation of cleansing the garments, possess the drawback of so snarling and tangling the clothes as to render the task of their separation more arduous than that of the washing. In such machines, there is an oscillating table which is provided with radial ribs by means of which the contents of the machine are so vigorously agitated as to thoroughly wash the clothes, but at the same time to wad them up in a tangled mass.

Attempts have been made to obviate this defect, but so far with indifferent success. One method devised has been to provide the table with a central post or stem up whose sides are run several ribs and by means of which the objectionable tangling has been partially overcome. The difficulty with this machine is that the vertical ribs are mere prolongations of the radial ribs, and, further, that the vertical ribs diminish in size as they approach the upper end of the post or stem.

In my improved washing machine, the vertical ribs are not made as prolongations of the radial ribs, but are independent thereof, each rising from a point midway between two of the radial ribs, and, in addition, each is constructed to increase in dimension toward the top of the post or stem. In this way, the powerful centrifugal currents engendered by the radial ribs and transmitted into vertical and inward movements by the sides of the tub and which are responsible for the central accumulation and snarling of the clothes are diverted from the center of the tub and thereby the clothes are kept in free agitation until the cleansing operation is completed, such cleansing being greatly hastened by my construction.

That is to say, the normal circulation of the clothes is retarded by currents that effect the free suspension and spreading out of the clothes in substantially equal layers throughout the body of liquid in which they are being washed. In this state, the oscillation of the agitator about its own axis imparts to the clothes oscillatory movements about the axis of the agitator as they are slowly circulated about an axis perpendicular to the axis of the agitator.

Figure 1:
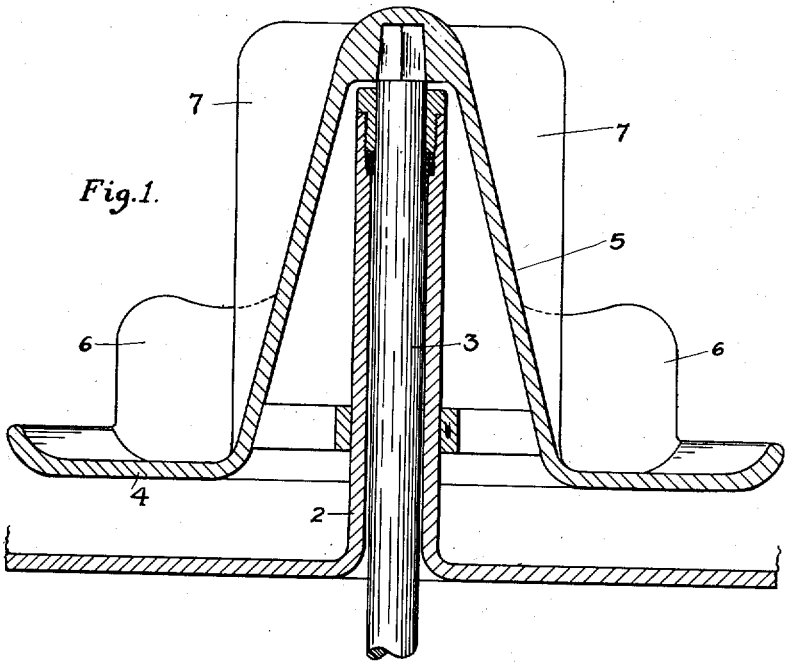
Figure 2:
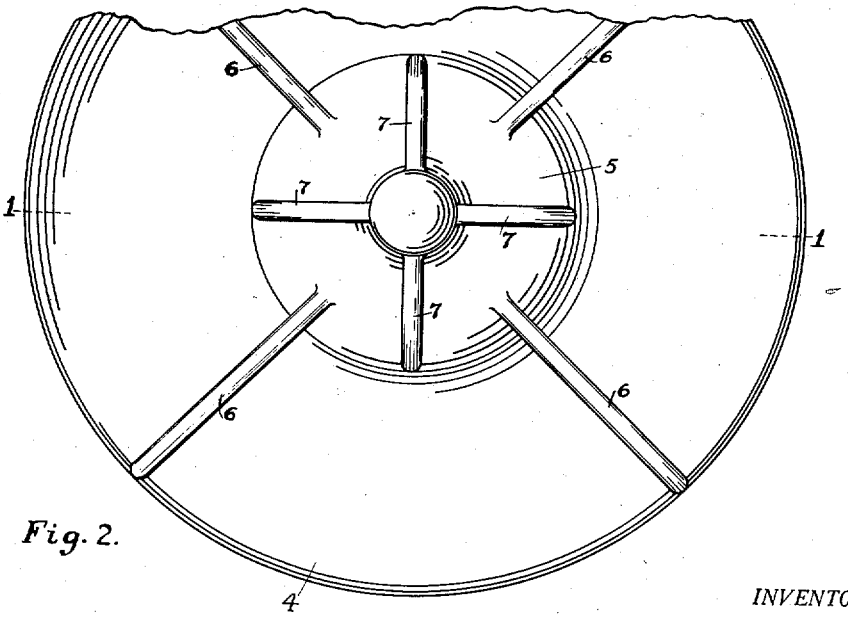

In the drawing forming part of this specification, Fig. 1 is a vertical section of the dolly of a washing machine, drawn on the line 1—1 in Fig. 2, and embodying my improvements.

Fig. 2 is a plan view of the dolly, represented as having a part broken away.

The reference numeral 1 designates a part of the bottom of a washing machine tub, having a tubular post 2 rising centrally therefrom, through which post passes the rotatively oscillating shaft 3 by means of which the agitator is actuated. A suitable distance above the tub bottom is a table 4 composing a portion of the agitator, and provided with a tapering post or stem 5 whose apex is mounted on and oscillated by the shaft 3.

A spider 8 provides a bearing for the agitator on the post 2, near the bottom thereof.

Reaching from the post 5 to the outer margin of the table 4 are the radial ribs 6, here shown as four in number and equidistant from each other. On the post 5 are an equal number of vertical ribs 7 whose outer edges are approximately vertical, whereby, through the strongly conical form of the post 5, each vertical rib is given a much greater radial dimension as it approaches its upper end.

It is this increased dimension of the vertical ribs at their upper portions which serves to give a strong radial and centrifugal throw to the tub's contents and thereby to prevent the massing and tangling of the clothes at the center; and by having the vertical ribs midway between and independent of the radial ribs, the opposing currents are rendered parallel and intermediate of each other, instead of meeting head-on and thereby neutralizing each other. Such paralleling of the water-currents serves to greatly hasten and more thoroughly accomplish the cleansing of the garments being washed.

I claim:

1. A dolly for washing machines, comprising an oscillating table having radial ribs thereon, and a central post rising therefrom, said post having vertical ribs whose radial dimension is larger at their upper ends than below.

2. A dolly for washing machines, comprising an oscillating table having radial ribs thereon, and a conical central post rising therefrom, said post having vertical ribs whose outer edges are vertical, whereby their upper radial dimension is greater than their lower.

3. A dolly for washing machines, comprising an oscillating table having radial ribs thereon, and a central post rising therefrom, said post having vertical ribs whose upper radial dimension is greater than their lower radial dimension, and which are independent of said radial ribs.

4. A dolly for washing machines, comprising an oscillating table having radial ribs thereon, and a central post rising therefrom, said post having vertical ribs thereon the lower end of each of which is midway between two of said radial ribs, and the upper ends of which vertical ribs are greater in radial dimension than are their lower portions.

5. A dolly for washing machines, comprising an oscillating table having radial ribs thereon, and a central conical post rising therefrom, said post having vertical ribs thereon equal in number to the radial ribs, each vertical rib having its lower end midway between two of said radial ribs, and its outer edge vertical, whereby to render its upper portion greater in radial dimension than its lower portion.

6. In a washing machine the combination with a container, of an agitator supported immediately above the bottom of said container and having a vertical wall, a bottom portion and an outwardly curved connection between said wall and said bottom, radial ribs extending along said bottom, vertical ribs extending along said wall and spaced from said radial ribs, the width of said vertical ribs decreasing from the top thereof downwardly.

7. In a washing machine, the combination with a container, a tubular post mounted therein, and a movable shaft extending through said post, of an agitator mounted on said shaft and having a downwardly extending conical wall, a bottom portion, an outwardly curved connection between said wall and said bottom, radial ribs extending along said bottom, and vertical ribs extending along said wall and spaced from said radial ribs.

8. In a washing machine the combination with a container, of an agitator supported immediately above the bottom of said container and having a vertical wall, a bottom portion having an upturned lip and an outwardly curved connection between said wall and bottom, radial ribs extending along said bottom, vertical ribs extending along said wall and spaced centrally between said radial ribs, the width of said vertical ribs decreasing from the top thereof downwardly.

9. In a washing machine the combination with a container, of an agitator supported immediately above the bottom of said container and having a vertical wall, a bottom portion, radial ribs extending along said bottom the outer ends thereof being of larger area than the immediately adjacent portion thereof, vertical ribs extending along said wall and spaced from said radial ribs, the width of said vertical ribs decreasing from the top thereof downwardly.

10. An agitator for washing machines, comprising an oscillating disk having a central post rising therefrom, comparatively widely spaced blade members extending radially from said post to a point substantially adjacent the periphery of said disk, and smaller rib members merging with the central post and disposed intermediate the blade members, the smaller rib members being of greater depth at one point and tapering therefrom.

11. In a machine adapted to wash a plurality of articles in a body of liquid, a disklike agitator supported within the tub, power means adapted to oscillate the agitator about a vertical axis, spaced impeller members extending radially on said disk adapted to cause said articles to circulate about an axis perpendicular to the vertical axis, intermediately spaced members above the impeller members and projecting radially less than half the radius of the impeller members and adapted to cause a positive spreading out of the articles throughout the body of liquid whereby the oscillations of the agitator impart whip-like weaving movements to said articles as they slowly circulate.

12. In a washing machine adapted to wash a plurality of articles in a proportioned body of liquid, a tub, an agitator supported within the tub, power means adapted to oscillate said agitator about its axis, said agitator having means adapted to cause said articles to circulate about an axis perpendicular to the axis of the agitator and additional means terminating near the axis of the agitator and adapted to positively retard the circulation of said articles and cause such a suspension and spreading of the articles in the body of liquid that the oscillations of the agitator will impart whip-like weaving movements to the suspended spread articles as they slowly circulate.

13. In a machine adapted to wash a plurality of articles in a body of liquid, a tub, an agitator supported within the tub, power means adapted to oscillate said agitator about a vertical axis, impeller means extending radially on said agitator, and of greater area near the periphery thereof and adapted to cause said articles to circulate about an axis perpendicular to the vertical axis, and additional means extending above the impeller means and adapted to positively retard the circulation of said articles so as to cause a suspension and spreading of the same substantially equally throughout the body of liquid enabling the oscillation of said agitator to impart whip-like movements to the suspended articles.

OTTO T. DEHLE.